United States Patent
Qin et al.

(10) Patent No.: US 10,755,381 B2
(45) Date of Patent: Aug. 25, 2020

(54) METHOD AND DEVICE FOR IMAGE STITCHING

(71) Applicant: HANGZHOU HIKVISION DIGITAL TECHNOLOGY CO., LTD., Hangzhou, Zhejiang (CN)

(72) Inventors: Cheng Qin, Zhejiang (CN); Hui Mao, Zhejiang (CN); Linjie Shen, Zhejiang (CN); Hai Yu, Zhejiang (CN); Shiliang Pu, Zhejiang (CN)

(73) Assignee: HANGZHOU HIKVISION DIGITAL TECHNOLOGY CO., LTD., Hangzhou, Zhejiang (CN)

( * ) Notice: Subject to any disclaimer, the term of this patent is extended or adjusted under 35 U.S.C. 154(b) by 197 days.

(21) Appl. No.: 15/773,544

(22) PCT Filed: Aug. 22, 2016

(86) PCT No.: PCT/CN2016/096182
§ 371 (c)(1),
(2) Date: May 3, 2018

(87) PCT Pub. No.: WO2017/076106
PCT Pub. Date: May 11, 2017

(65) Prior Publication Data
US 2018/0330471 A1    Nov. 15, 2018

(30) Foreign Application Priority Data
Nov. 6, 2015    (CN) .......................... 2015 1 0752156

(51) Int. Cl.
*G06K 9/36*    (2006.01)
*G06T 3/40*    (2006.01)
(Continued)

(52) U.S. Cl.
CPC ............ *G06T 3/4038* (2013.01); *G06F 17/16* (2013.01); *G06T 5/50* (2013.01); *G06T 7/70* (2017.01);
(Continued)

(58) Field of Classification Search
CPC .... H04N 5/23238; B60R 1/00; G06T 3/4038; G06T 2207/30252; G06T 7/33
(Continued)

(56) References Cited

U.S. PATENT DOCUMENTS 8,547,434 B2 * 10/2013 Chen ...................... H04N 7/181
                                                        348/143
9,723,272 B2 *  8/2017 Lu .......................... H04N 7/181
(Continued)

FOREIGN PATENT DOCUMENTS

| CN | 101673395 A | 3/2010 |
|---|---|---|
| CN | 104134188 A | 11/2014 |

(Continued)

OTHER PUBLICATIONS

CN 101673395 A—Machine Translation.
(Continued)

*Primary Examiner* — Charlotte M Baker
(74) *Attorney, Agent, or Firm* — David W. Carstens; J. Andrew Reed; Carstens & Cahoon, LLP

(57) ABSTRACT

The present application discloses a method and a device for image stitching. The method includes: obtaining a first image acquired by a first camera and a second image acquired by a second camera, wherein the first image is an image with visible light information, the second image is an image including depth information and visible light information, the first camera and the second camera are disposed adjacent to each other, and there is an overlapping area between the acquired first image and second image; map-
(Continued)

ping pixels in the second image to the overlapping area and/or an extended area, wherein the extended area is an image area formed by pixels in the second image which are mapped to the outside of the first image; stitching the mapped pixels in the second image to the overlapping area and/or the extended area based on depth information and visible light information of the pixels in the second image to obtain a stitched image. The present application solves the technical problem of a low stitching efficiency in the image stitching process in the prior art.

19 Claims, 3 Drawing Sheets

(51) Int. Cl.
    *H04N 5/232*     (2006.01)
    *G06T 7/70*     (2017.01)
    *G06F 17/16*     (2006.01)
    *G06T 5/50*     (2006.01)

(52) U.S. Cl.
    CPC ..... *H04N 5/23238* (2013.01); *G06T 2200/32* (2013.01); *G06T 2207/10028* (2013.01); *G06T 2207/20221* (2013.01)

(58) Field of Classification Search
    USPC .................. 382/284, 128, 278; 348/143, 159
    See application file for complete search history.

(56) References Cited

U.S. PATENT DOCUMENTS

| | | |
|---|---|---|
| 2011/0316963 A1 | 12/2011 | Li et al. |
| 2012/0133639 A1 | 5/2012 | Kopf et al. |

FOREIGN PATENT DOCUMENTS

| | | |
|---|---|---|
| CN | 104318547 A | 1/2015 |
| CN | 104463899 A | 3/2015 |
| CN | 104519340 A | 4/2015 |
| CN | 104680520 A | 6/2015 |
| CN | 104899869 A | 9/2015 |

OTHER PUBLICATIONS

CN 104318547 A—Machine Translation.
CN 104519340 A—Machine Translation.
CN 104680520 A—Machine Translation.
Min Seok et al: "Acquisition of Dual RGBD Images", 28th International Technical Conference on Circuits/Systems, Computers and Communications, Nov. 2, 2013 (Nov. 2, 2013), XP055678924, Yeosu, South Korea.
Feng Guanghua et al: "LOIND: An illumination and scale invariant RGB-D descriptor", 2015 IEEE International Conference on Robotics and Automation (ICRA), IEEE, May 26, 2015 (May 26, 2015), pp. 1893-1898, XP033168659, DOI: 10.1109/ICRA.2015.7139445 [retrieved on Jun. 29, 2015].
Rizwan Macknojia et al: "Calibration of a network of kinect sensors for robotic inspection over a large workspace", Robot Vision (WORV), 2013 IEEE Workshop on, IEEE, Jan. 15, 2013 (Jan. 15, 2013), pp. 184-190, XP032415741, DOI: 10.1109/WORV.2013.6521936 ISBN: 978-1-4673-5646-6.
Matthew Brown et al: "Automatic Panoramic Image Stitching using Invariant Features", International Journal of Computer Vision, Kluwer Academic Publishers, BO, vol. 74, No. 1, Dec. 19, 2006 (Dec. 19, 2006), pp. 59-73, XP019509435, ISSN: 1573-1405.
Extended European Search Report for Application No. EP 16861375 Issued by the European Patent Office dated Apr. 22, 2020 (Apr. 22, 2020).

\* cited by examiner

METHOD AND DEVICE FOR IMAGE STITCHING

The present application claims the priority to a Chinese patent application No. 201510752156.X filed with the State Intellectual Property Office of the People's Republic of China on Nov. 6, 2015 and entitled "Method and Device for Image Stitching", which is incorporated herein by reference in its entirety.

TECHNICAL FIELD

The present application relates to the field of image processing, in particular to a method and a device for image stitching.

BACKGROUND

Image stitching technology is a technology for stitching several images with overlapping sections to produce a large seamless high-resolution image. The field of view of a camera can be increased by image stitching. Compared with methods that use a lens with a larger field of view to increase the field of view, the method for image stitching results in less distortion.

Conventional methods for two-dimensional images stitching, for example, SIFT (Scale Invariant Feature Transform) based stitching algorithms, are computationally intensive and are prone to errors in complex scenes, resulting in poor quality of stitched images. Moreover, during image stitching, ghosting may easily appear in a transitional zone due to the difference between the calibrated depth and the actual depth. For another example, depth-image-based stitching methods employ a plurality of visible light cameras to acquire image information, and perform stitching based on depth information obtained according to the principle of stereoscopic vision among cameras. Because these methods require matching of feature points in real-time, the real-time effect of stitching is affected.

With the technology for obtaining depth information becoming more and more mature, a method for image stitching in combination with depth information is proposed in the prior art, including: searching for an overlapping area between a target image and an image to be stitched, obtaining the depth information of the overlapping area through a depth camera, obtaining an amount of parallax based on the depth information, and mapping pixels of the overlapping area to the target image. Compared with conventional methods for two-dimensional image stitching, the method for image stitching in combination with depth information described above can be applied to stitch images in more complex scenes. In addition, an additional depth camera is added on the basis of a plurality of visible light cameras to obtain the depth information of the overlapping area, which can solve the problem of ghosting in the conventional methods for two-dimensional image stitching. However, this method has the following problems. First, the prior art needs to perform pre-calculation to obtain an overlapping area, obtain a depth image of the overlapping area through a depth camera, and align depth information of pixels in the overlapping area with visible light information, resulting in a less efficient stitching process. Second, the prior art needs to identify an overlapping area, and map the pixels in the overlapping area and those in an extended area in two different ways. There may be an abrupt change in a transitional zone, resulting in an undesirable fusion of a transitional segment between the overlapping area and the extended area. Furthermore, in related processes of image stitching based on depth information, the depth information is not used in the mapping process to transform pixels in the extended area. When pixels in an image to be stitched are mapped to a target image, due to the change of viewpoints, visible pixels that can be observed in the image to be stitched may be invisible in the stitched target image, thus an occlusion of foreground and background cannot be handled very well.

There have been no effective solutions proposed yet to solve the problem of a low stitching efficiency in the image stitching process above.

SUMMARY

Embodiments of the present application provide a method and a device for image stitching, so as to at least solve the technical problem of a low stitching efficiency in the image stitching process in the prior art.

According to an aspect of embodiments of the present application, a method for image stitching is provided, including: obtaining a first image acquired by a first camera and a second image acquired by a second camera, wherein the first image is an image with visible light information, the second image is an image including depth information and visible light information, and the first camera and the second camera are disposed adjacent to each other, and there is an overlapping area between the acquired first image and second image; mapping pixels in the second image to the overlapping area and/or an extended area, wherein the extended area is an image area formed by pixels in the second image which are mapped to the outside of the first image; stitching the mapped pixels in the second image to the overlapping area and/or the extended area based on depth information and visible light information of the pixels in the second image to obtain a stitched image.

Further, the step of mapping the pixels in the second image to the overlapping area and/or an extended area includes: reading coordinate information of a pixel in the second image in a second image coordinate system; mapping the coordinate information of the pixel in the second image in the second image coordinate system to a first image coordinate system by using coordinate transformation to obtain coordinate information of the pixel in the second image in the first image coordinate system; determining a position of the pixel in the second image in the overlapping area and/or the extended area based on the coordinate information of the pixel in the second image in the first image coordinate system.

Further, the step of mapping the coordinate information of the pixel in the second image in the second image coordinate system to a first image coordinate system by using coordinate transformation to obtain coordinate information of the pixel in the second image in the first image coordinate system, includes: mapping the coordinate information of the pixel in the second image in the second image coordinate system to a second camera coordinate system to obtain coordinate information of the pixel in the second image in the second camera coordinate system; mapping the coordinate information of the pixel in the second image in the second camera coordinate system to a first camera coordinate system to obtain coordinate information of the pixel in the second image in the first camera coordinate system; mapping the coordinate information of the pixel in the second image in the first camera coordinate system to the first image coordinate system to obtain coordinate information of the pixel in the second image in the first image coordinate system.

Further, the coordinate information $m_2(u_2,v_2)$ of the pixel in the second image in the second image coordinate system is mapped to the second camera coordinate system by using a first formula as follows to obtain coordinate information $m_2(X_2,Y_2,Z_2)$ of the pixel in the second image in the second camera coordinate system:

$$\begin{bmatrix} X_2 \\ Y_2 \\ Z_2 \\ 1 \end{bmatrix} = D_2 * A_2^{-1} * \begin{bmatrix} u_2 \\ v_2 \\ 1 \end{bmatrix},$$

wherein $A_2$ is an intrinsic parameter of the second camera; and $D_2$ is a scale factor of the second image.

Further, the coordinate information $m_2(X_2,Y_2,Z_2)$ of the pixel in the second image in the second camera coordinate system is mapped to the first camera coordinate system by using a second formula as follows to obtain coordinate information $m_1(X_1,Y_1,Z_1)$ of the pixel in the second image in the first camera coordinate system:

$$\begin{bmatrix} X_1 \\ Y_1 \\ Z_1 \\ 1 \end{bmatrix} = \begin{bmatrix} R, t \\ 0^T, 1 \end{bmatrix} \begin{bmatrix} X_2 \\ Y_2 \\ Z_2 \\ 1 \end{bmatrix},$$

wherein R is a rotation matrix for the first camera coordinate system relative to the second camera coordinate system, t is a translation vector for the first camera coordinate system relative to the second camera coordinate system.

Further, the coordinate information $m_1(X_1,Y_1,Z_1)$ of the pixel in the second image in the first camera coordinate system is mapped to the first image coordinate system by using a third formula as follows to obtain coordinate information $m_1(u_1,v_1)$ of the pixel in the second image in the first image coordinate system:

$$\begin{bmatrix} u_1 \\ v_1 \\ 1 \end{bmatrix} = \frac{A_1}{D_1} \begin{bmatrix} X_1 \\ Y_1 \\ Z_1 \\ 1 \end{bmatrix},$$

wherein $A_1$ is an intrinsic parameter of the first camera; and $D_1$ is a scale factor of the first image.

Further, the step of stitching the mapped pixels in the second image to the overlapping area and/or the extended area based on the depth information and visible light information of the pixels in the second image to obtain a stitched image, includes: when the pixel in the second image is mapped to the overlapping area of the first image and the second image, performing a weighting operation on the visible light information of the pixel in the first image and the visible light information of the pixel in the second image, and assigning the weighted visible light information to the visible light information of the pixel in the overlapping area in the stitched image; when the pixel in the second image is mapped to the extended area, assigning the visible light information of the pixel in the second image to the visible light information of the pixel in the extended area in the stitched image.

Further, the step of stitching the mapped pixels in the second image to the overlapping area and/or the extended area based on the depth information and visible light information of the pixels in the second image to obtain a stitched image, includes: determining whether a plurality of pixels in the second image are mapped to a same pixel in the overlapping area and/or the extended area, based on the coordinate information of the mapped pixel in the second image in the first image coordinate system; when the plurality of pixels in the second image are mapped to the same pixel in the overlapping area and/or the extended area, determining visible light information of the same pixel, in the overlapping area and/or the extended area in the stitched image based on a plurality of pieces of depth information of the plurality of pixels in the second image.

Further, the step of determining the visible light information of the same pixel, in the overlapping area and/or the extended area in the stitched image based on a plurality of pieces of depth information of the plurality of pixels in the second image, includes: comparing the plurality of pieces of depth information of the plurality of pixels in the second image, and assigning the visible light information of a pixel with the smallest depth information among the plurality of pieces of depth information to visible light information of the same pixel in the overlapping area and/or the extended area in the stitched image; or performing a weighting operation on the visible light information of the plurality of pixels in the second image, and assigning the weighted visible light information to visible light information of the same pixel in the overlapping area and/or the extended area in the stitched image.

According to another aspect of embodiments of the present application, a device for image stitching is provided, including: an obtaining unit, configured for obtaining a first image acquired by a first camera and a second image acquired by a second camera, wherein the first image is an image with visible light information, the second image is an image including depth information and visible light information, and the first camera and the second camera are disposed adjacent to each other, and there is an overlapping area between the acquired first image and second image; a mapping unit, configured for mapping pixels in the second image to the overlapping area and/or an extended area, wherein the extended area is an image area formed by pixels in the second image which are mapped to the outside of the first image; a stitching unit, configured for stitching the mapped pixels in the second image to the overlapping area and/or the extended area based on depth information and visible light information of the pixels in the second image to obtain a stitched image.

Further, the mapping unit includes: a reading module, configured for reading coordinate information of a pixel in the second image in a second image coordinate system; a coordinate transformation module, configured for mapping the coordinate information of the pixel in the second image in the second image coordinate system to a first image coordinate system by using coordinate transformation to obtain coordinate information of the pixel in the second image in the first image coordinate system; a determining module, configured for determining a position of the pixel in the second image in the overlapping area and/or the extended area based on the coordinate information of the pixel in the second image in the first image coordinate system.

Further, the coordinate transformation module includes: a first mapping sub-module, configured for mapping the coordinate information of the pixel in the second image in the second image coordinate system to a second camera coordinate system to obtain coordinate information of the pixel in the second image in the second camera coordinate system; a second mapping sub-module, configured for mapping the coordinate information of the pixel in the second image in the second camera coordinate system to a first camera coordinate system to obtain coordinate information of the pixel in the second image in the first camera coordinate system; a third mapping sub-module, configured for mapping the coordinate information of the pixel in the second image in the first camera coordinate system to the first image coordinate system to obtain coordinate information of the pixel in the second image in the first image coordinate system.

Further, the first mapping sub-module obtains coordinate information $m_2(X_2,Y_2,Z_2)$ of the pixel in the second image in the second camera coordinate system through calculation according to a first formula as follows:

$$\begin{bmatrix} X_2 \\ Y_2 \\ Z_2 \\ 1 \end{bmatrix} = D_2 * A_2^{-1} * \begin{bmatrix} u_2 \\ v_2 \\ 1 \end{bmatrix},$$

wherein $A_2$ is an intrinsic parameter of the second camera; and $D_2$ is a scale factor of the second image.

Further, the second mapping sub-module obtains coordinate information $m_1(X_1,Y_1,Z_1)$ of the pixel in the second image in the first camera coordinate system through calculation according to a second formula as follows:

$$\begin{bmatrix} X_1 \\ Y_1 \\ Z_1 \\ 1 \end{bmatrix} = \begin{bmatrix} R, t \\ 0^T, 1 \end{bmatrix} \begin{bmatrix} X_2 \\ Y_2 \\ Z_2 \\ 1 \end{bmatrix},$$

wherein R is a rotation matrix for the first camera coordinate system relative to the second camera coordinate system, t is a translation vector for the first camera coordinate system relative to the second camera coordinate system.

Further, the third mapping sub-module obtains coordinate information $m_1(u_1,v_1)$ of the pixel in the second image in the first image coordinate system through calculation according to a third formula as follows:

$$\begin{bmatrix} u_1 \\ v_1 \\ 1 \end{bmatrix} = \frac{A_1}{D_1} \begin{bmatrix} X_1 \\ Y_1 \\ Z_1 \\ 1 \end{bmatrix},$$

wherein $A_1$ is an intrinsic parameter of the first camera; and $D_1$ is a scale factor of the first image.

Further, the stitching unit includes: a first stitching module configured for, when the pixel in the second image is mapped to the overlapping area, performing a weighting operation on the visible light information of the pixel in the first image and the visible light information of the pixel in the second image, and assigning the weighted visible light information to the visible light information of the pixel in the overlapping area in the stitched image; and a second stitching module configured for, when the pixel in the second image is mapped to the extended area, assigning the visible light information of the pixel in the second image to the visible light information of the pixel in the extended area in the stitched image.

Further, the stitching unit includes: a judging module, configured for determining whether a plurality of pixels in the second image are mapped to a same pixel in the overlapping area and/or the extended area, based on the coordinate information of the mapped pixel in the second image in the first image coordinate system; a determining module configured for, when the plurality of pixels in the second image are mapped to the same pixel in the overlapping area and/or the extended area, determining visible light information of the same pixel, in the overlapping area and/or the extended area in the stitched image based on a plurality of pieces of depth information of the plurality of pixels in the second image.

Further, the determining module includes: a comparing sub-module, configured for comparing the plurality of pieces of depth information of the plurality of pixels in the second image, and assigning visible light information of a pixel with the smallest depth information among the plurality of pieces of depth information to visible light information of the same pixel in the overlapping area and/or the extended area in the stitched image; a weighting sub-module, configured for performing a weighting operation on visible light information of the plurality of pixels in the second image, and assigning the weighted visible light information to visible light information of the same pixel in the overlapping area and/or the extended area in the stitched image.

The present application further provides an electronic apparatus, including: a housing, a processor, a memory, a circuit board and a power supply circuit, wherein the circuit board is arranged inside a space enclosed by the housing, the processor and the memory are arranged on the circuit board; the power supply circuit is configured to supply power for various circuits or elements of the electronic apparatus; the memory is configured to store executable program codes; and the processor performs the method for image stitching provided by the embodiments of the present application by executing the executable program codes stored on the memory.

The present application further provides an application for performing the method for image stitching provided by the embodiments of the present application when executed.

The present application further provides a storage medium for storing executable program codes, the executable program codes are executed to perform the method for image stitching provided by the embodiments of the present application.

In the embodiments of the present application, obtaining a first image acquired by a first camera and a second image acquired by a second camera, wherein the second image is an RGB-D image including depth information and visible light information; mapping pixels in the second image to the first image, and stitching the mapped pixels in the second image to the first image based on depth information and visible light information of the pixels in the second image to obtain a stitched image; and using an RGB-D camera to obtained both the visible light information and the depth information at the same time, thereby achieving the purpose that no alignment is required to be performed on the depth information and the visible light information of the pixels in the overlapping area, thereby improving the efficiency of image stitching and further solving the technical problem of a low stitching efficiency in the image stitching process in the prior art.

BRIEF DESCRIPTION OF THE DRAWINGS

The drawings described herein are used to provide further understanding of the present application, and form a part of the present application. The schematic embodiments and description herein are used to explain the present application and do not constitute improper limitations on the present application. In the drawings.

DETAILED DESCRIPTION

Figure 1:
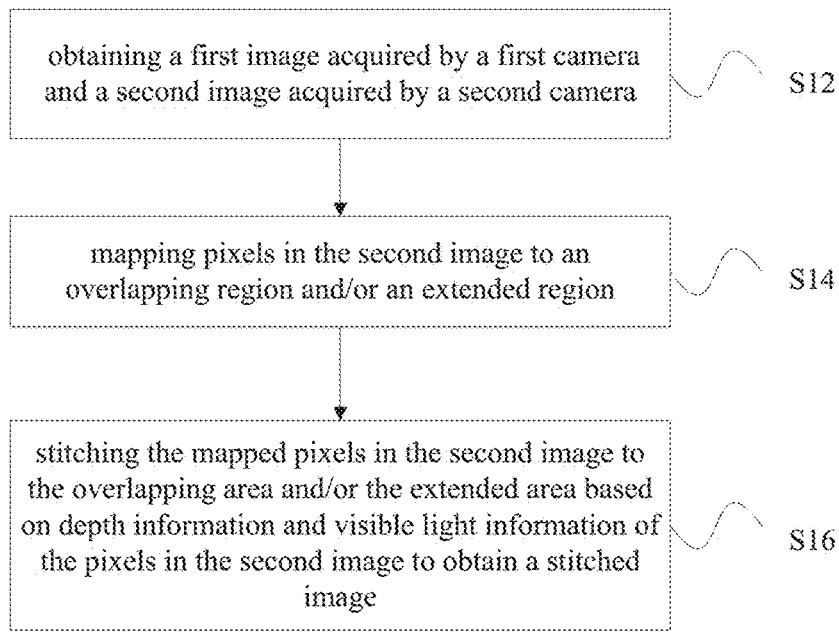
FIG. 1 is a flowchart of an optional method for image stitching according to a first embodiment of the present application.

In order to make those of ordinary skills in the art to understand the solution of the application better, the technical solution of the application will be described clearly and completely in detail with reference to the drawings of embodiments of the present application. Obviously, the embodiments described are merely some of the embodiments of the present application, instead of all the embodiments. All other embodiments obtained by those of ordinary skills in the art based on the embodiments herein without any creative efforts should be within the scope of the present application.

It should be noted that the terms such as "first", "second" and the like in the description and claims of the present application and in the drawings described above are used to distinguish similar objects, and are not necessarily used to describe a specific order or sequence. It should be understood that the data used in this way are interchangeable under appropriate circumstances so that the embodiments of the present application described herein can be implemented in an order other than those illustrated or described herein. Moreover, the terms "include" and "have" or any variants thereof are intended to cover non-exclusive inclusions. For example, processes, methods, systems, products or devices including a series of steps or elements include not only those steps or elements specifically listed but also those not specifically listed or intrinsic to such processes, methods, systems, products or devices.

First Embodiment

According to embodiments of the present application, an embodiment of a method for image stitching is provided. It should be noted that the steps shown in the flowchart of the drawings can be performed in a computer system, such as a computer system that can execute a set of computer-executable instructions. Although a logical order is shown in the flowchart, in some cases, the steps shown or described can be performed in an order different from the logical order herein.

FIG. 1 is a flowchart of an optional method for image stitching according to a first embodiment of the present application. As shown in FIG. 1, the method includes:

Step S12, obtaining a first image acquired by a first camera and a second image acquired by a second camera, wherein the first image is an image with visible light information, and the second image is an image including depth information and visible light information, the first camera and the second camera are disposed adjacent to each other, and there is an overlapping area between the acquired first image and second image.

Specifically, in the step S12, the first image may be a target image in the image stitching, the second image can be an image to be stitched in the image stitching, and there can be one or more images to be stitched. When there are more than one image to be stitched, the stitching step is the same as the step of stitching the second image to the first image. The first image can be a visible light image acquired by a visible light camera. When the first image is a visible light image acquired by the visible light camera, the first image can be used as a part of the target image to reduce the amount of computations and save camera costs. The second camera can be an RGB-D camera, and the second image acquired can be an RGB-D image that includes a visible light image and a depth image. That is, any pixel in the second image has both visible light information and depth information. Herein, the first camera and the second camera can be binocular cameras.

It should be noted that in the process of stitching the second image to the first image, there has to be an overlapping area between the second image and the first image. Because any pixel in the second image (i.e., an RGB-D image) contains both depth information and visible light information, for the pixels in the overlapping area, it is unnecessary to align the depth information and the visible light information in the mapping process, thereby the purpose of improving the stitching efficiency is achieved.

Step S14, mapping pixels in the second image to the overlapping area and/or an extended area.

Specifically, the pixels in the second image (i.e., an image to be stitched) can be mapped to the first image (i.e., a target image) by coordinate transformation. Since the process of mapping any pixel in the second image to the first image is the same. That is to say, in the embodiment of the present application, the pixels in the overlapping area and in the extended area are mapped using the same method. Thus, the problems that there is ghosting in the transitional zone in the stitched image and that there may be an abrupt change in the transitional segment between the overlapping area and the extended area are solved, and the quality of fusion of the transitional segment between the overlapping area and the extended area is improved.

It should be noted that in the process of stitching the second image to the first image, there has to be an overlapping area between the second image and the first image. In the solution provided by the present application, because the process of mapping any pixel in the second image to the first image is the same, i.e., matching of feature points is not required in the present application, the area of the overlapping area can be reduced as much as possible, and thus the purpose of obtaining a stitched image with a larger field of view is achieved with the same number of stitching.

Step S16, stitching the mapped pixels in the second image to the overlapping area and/or the extended area based on depth information and visible light information of the pixels in the second image to obtain a stitched image.

Specifically, when a pixel in the second image is mapped to the overlapping area, this pixel can have two pieces of visible light information and one piece of depth information. That is, for a pixel in the overlapping area, the amount of the visible light information is different from that of the depth information. When a pixel in the second image is mapped to the extended area, this pixel can have one piece of visible light information and one piece of depth information, or when there is an occlusion in a pixel in the extended area, this pixel can have a plurality of pieces of visible light information and a plurality of pieces of depth information. That is, the pixel in the extended area has the same amount of visible light information and depth information.

It should be noted that when a pixel in the second image is mapped to the overlapping area, a weighting operation can be performed on the two pieces of visible light information, and the result of the weighting operation can be determined as the visible light information of the mapped pixel in the second image in the stitched image. When a pixel in the second image is mapped to the extended area, the visible light information of the pixel in the second image can be determined as the visible light information of the mapped pixel in the second image in the stitched image. When a plurality of pixels in the second image are mapped to the extended area and there is an occlusion, it is possible to compare a plurality of depth information of the plurality of pixels and determine the visible light information of the pixel with the smallest depth information as the visible light information of the plurality of mapped pixels in the stitched image.

It should also be noted that the present application determines the visible light information of the pixel in the stitched image based on the depth information and the visible light information of the pixel, which solves the problem that an occlusion occurs in the foreground and background during the image stitching, and improves stitching quality.

Figure 2:
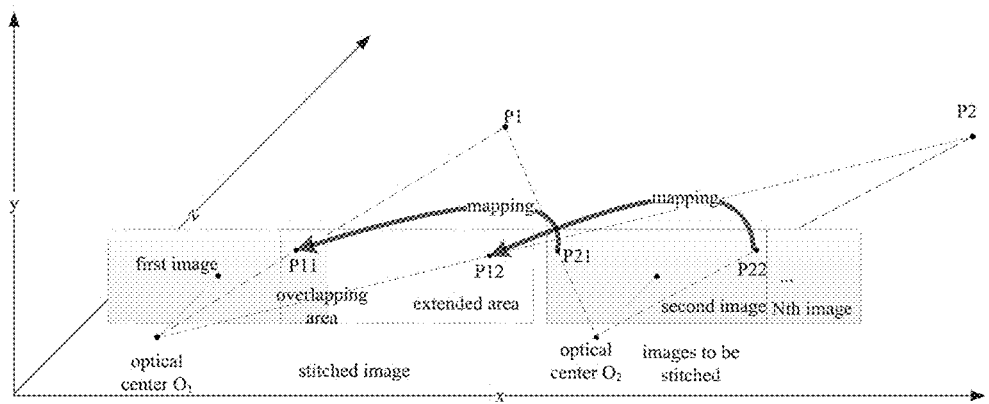
FIG. 2 is a schematic diagram illustrating an optional mapping of pixels according to the first embodiment of the present application.

In an optional application scenario, the method for image stitching provided in the steps S12 to S16 described above can include the followings. FIG. 2 is a schematic diagram illustrating an optional mapping of pixels according to the first embodiment of the present application. In FIG. 2, the first image is a visible light image obtained from a visible light camera, and the second image until the Nth image are RGB-D images obtained from an RGB-D camera. The first image is the target image, the second image until the Nth image are images to be stitched, and the Nth image and the second image are stitched to the first image through the same stitching method. Take stitching the second image to the first image as an example, the dotted rectangle in FIG. 2 represents a stitched image formed by stitching the second image to the first image, the plane of the stitched image can be the plane of the camera acquiring the first image, thus the first image acquired by the first camera can be directly mapped to the stitching image without calculations. A first point P1 in space is imaged as a pixel P11 in the first image and imaged as a pixel P21 in the second image, and a second point P2 in space is imaged as a pixel P12 in the first image and imaged as a pixel P22 in the second image. The mapping process for the first point P1 in space is to map P21 to P11. The stitching process for the first point P1 in space is to fuse P21 and P11 in the overlapping area, and perform a weighting operation on the visible light information of P21 and the visible light information of P11 to determine the visible light information of the point P1 on the stitched image. The mapping process for the second point P2 in space is to map P22 to P12. The stitching process for the second point P2 in space is to stitch P22 to P12 in the extended area, and determine the visible light information of P22 as that of P12 if there is no occlusion, or determine the visible light information of P12 based on the depth information if there is an occlusion.

Figure 3:
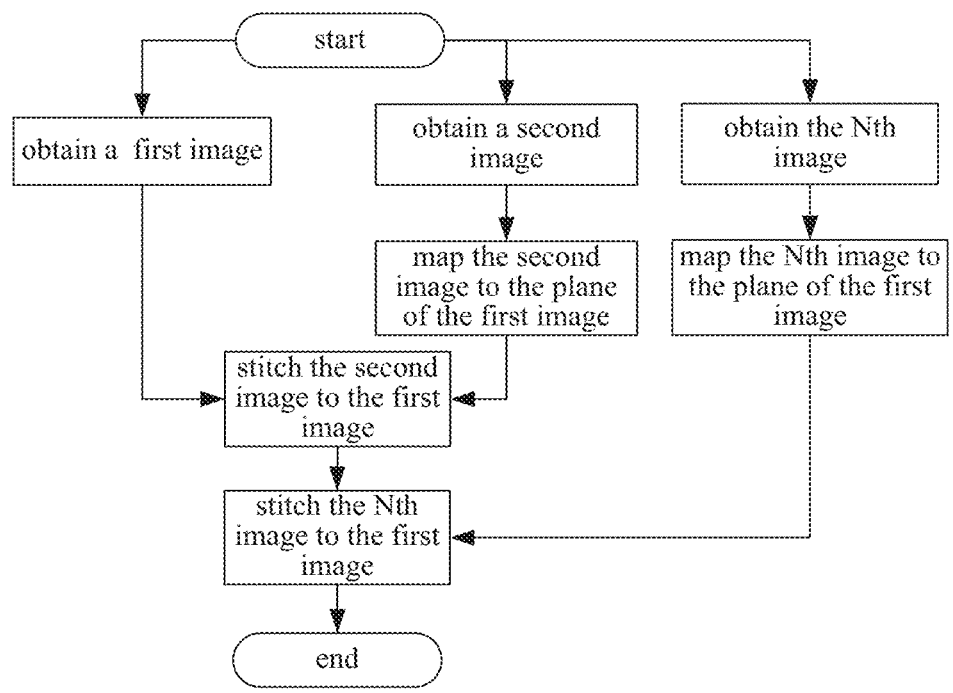
FIG. 3 is a schematic diagram of another optional method for image stitching according to the first embodiment of the present application.

In another optional application scenario, when there are more than one second image, i.e., there are a plurality of images to be stitched, the procedure of stitching the second image to the first image can be performed to stitch the plurality of images to be stitched (i.e., second images) to the first image one by one. FIG. 3 is a schematic diagram of another optional method for image stitching according to the first embodiment of the present application. As shown in FIG. 3, in the method provided by the present application, when there are a plurality of images to be stitched (i.e., the second image, until the Nth image), it is possible to stitch the second image to the first image first, and then stitch the Nth image to the first image.

In the embodiments of the present application, with the steps S12 to S16, i.e., obtaining first image acquired by a first camera and a second image acquired by a second camera, wherein the first image is an image with visible light information, the second image is an image including depth information and visible light information, the first camera and the second camera are disposed adjacent to each other, and there is an overlapping area between the acquired first image and second image; mapping the pixels in the second image to the overlapping area and/or an extended area, wherein the extended area is an image area formed by pixels in the second image which are mapped to the outside of the first image; and stitching the mapped pixels in the second image to the overlapping area and/or the extended area based on depth information and visible light information of the pixels in the second image to obtain a stitched image; and obtaining both the visible light information and the depth information through an RGB-D camera at the same time, it achieves the purpose of no need to align the depth information and visible light information of the pixels in the overlapping area, thereby realizing the technical effect of improving the efficiency of image stitching and further solving the technical problem of a low stitching efficiency in the image stitching process in the prior art.

Optionally, step S14, mapping the pixels in the second image to the overlapping area and/or an extended area, can include:

Step S141, reading coordinate information of a pixel in the second image in a second image coordinate system.

Step S143, mapping the coordinate information of the pixel in the second image in the second image coordinate system to a first image coordinate system by using coordinate transformation to obtain coordinate information of the pixel in the second image in the first image coordinate system.

Step S145, determining a position of the pixel in the second image in the overlapping area and/or the extended area based on the coordinate information of the pixel in the second image in the first image coordinate system.

Specifically, in the steps S141 to S145, the first image coordinate system and the second image coordinate system are two-dimensional image coordinate systems. The coordinate information of the pixel in the second image is mapped to the first image coordinate system by using coordinate transformation to obtain coordinate information of the pixel in the second image in the first image coordinate system.

Figure 4:
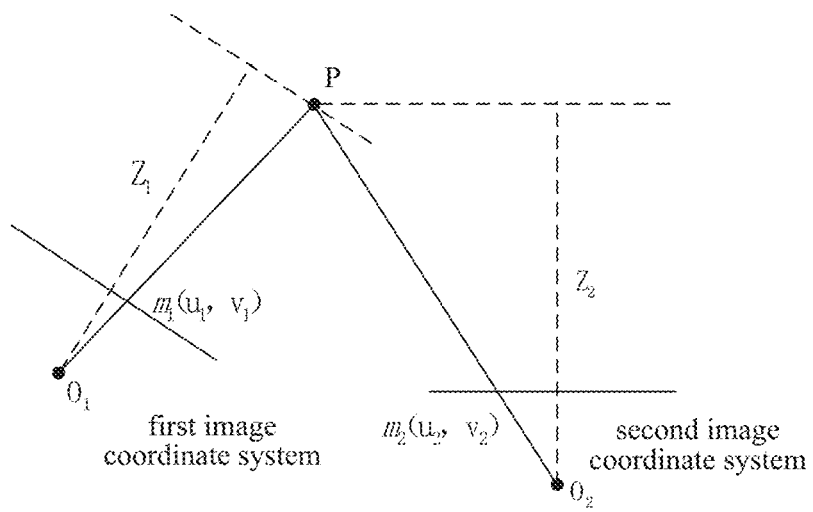
FIG. 4 is a schematic diagram illustrating another optional mapping of pixels according to the first embodiment of the present application.

In an optional application scenario, FIG. 4 is a schematic diagram illustrating another optional mapping of pixels according to the first embodiment of the present application. For any point P in space, the coordinate information of the corresponding pixel in the first image in the first image coordinate system is $m_1(u_1,v_1)$, and the coordinate information of the corresponding pixel in the second image in the second image coordinate system is $m_2(u_2,v_2)$, wherein $O_1$ and $O_2$ are the optical centers of the first camera and the second camera, respectively, $Z_1$ is the distance of the pixel in the first image corresponding to the point P from the first camera coordinate system to the world coordinate system (i.e., the depth information of $m_1$ in the first camera coordinate system), and $Z_2$ is the distance of the pixel in the second image corresponding to the point P from the second camera coordinate system to the world coordinate system (i.e., the depth information of nm, in the second camera coordinate system).

Optionally, step S143, mapping the coordinate information of the pixel in the second image in the second image coordinate system to a first image coordinate system by using coordinate transformation to obtain coordinate information of the pixel in the second image in the first image coordinate system, can include:

Step S1431, mapping the coordinate information of the pixel in the second image in the second image coordinate system to a second camera coordinate system to obtain coordinate information of the pixel in the second image in the second camera coordinate system.

Step S1433, mapping the coordinate information of the pixel in the second image in the second camera coordinate system to a first camera coordinate system to obtain coordinate information of the pixel in the second image in the first camera coordinate system.

Step S1435, mapping the coordinate information of the pixel in the second image in the first camera coordinate system to the first image coordinate system to obtain coordinate information of the pixel in the second image in the first image coordinate system.

Specifically, the coordinate information of the pixel in the second image is mapped to the first image coordinate system by using coordinate transformation to obtain coordinate information of the pixel in the second image in the first image coordinate system.

Optionally, the coordinate information $m_2(u_2,v_2)$ of the pixel in the second image in the second image coordinate system is mapped to the second camera coordinate system by using a first formula as follows to obtain coordinate information $m_2(X_2,Y_2,Z_2)$ of the pixel in the second image in the second camera coordinate system:

$$\begin{bmatrix} X_2 \\ Y_2 \\ Z_2 \\ 1 \end{bmatrix} = D_2 * A_2^{-1} * \begin{bmatrix} u_2 \\ v_2 \\ 1 \end{bmatrix},$$

wherein, $X_2$ is the abscissa of the pixel in the second image in the second camera coordinate system, $Y_2$ is the ordinate of the pixel in the second image in the second camera coordinate system, $Z_2$ is the depth information of the pixel in the second image in the second camera coordinate system; $A_2$ is an intrinsic parameter of the second camera; $A_2^{-1}$ is the inverse matrix of $A_2$; $D_2$ is a scale factor of the second image, $u_2$ is the abscissa of the pixel in the second image in the second image coordinate system, $v_2$ is the ordinate of the pixel in the second image in the second image coordinate system.

Optionally, the coordinate information $m_2(X_2,Y_2,Z_2)$ of the pixel in the second image in the second camera coordinate system is mapped to the first camera coordinate system by using a second formula as follows to obtain coordinate information $m_1(X_1,Y_1,Z_1)$ of the pixel in the second image in the first camera coordinate system:

$$\begin{bmatrix} X_1 \\ Y_1 \\ Z_1 \\ 1 \end{bmatrix} = \begin{bmatrix} R, t \\ 0^T, 1 \end{bmatrix} \begin{bmatrix} X_2 \\ Y_2 \\ Z_2 \\ 1 \end{bmatrix},$$

wherein, $X_1$ is the abscissa of the pixel in the second image in the first camera coordinate system, $Y_1$ is the ordinate of the pixel in the second image in the first camera coordinate system, $Z_1$ is the depth information of the pixel in the second image in the first camera coordinate system; R is a rotation matrix for the first camera coordinate system relative to the second camera coordinate system; t is a translation vector for the first camera coordinate system relative to the second camera coordinate system; $O^T$ is a zero matrix, $X_1$ is the abscissa of the pixel in the second image in the second camera coordinate system, $Y_1$ is the ordinate of the pixel in the second image in the second camera coordinate system, $Z_1$ is the depth information of the pixel in the second image in the second camera coordinate system.

Optionally, the coordinate information $m_1(X_1,Y_1,Z_1)$ of the pixel in the second image in the first camera coordinate system is mapped to the first image coordinate system by using a third formula as follows to obtain coordinate information $m_1(u_1,v_1)$ for the pixel in the second image in the first image coordinate system;

$$\begin{bmatrix} u_1 \\ v_1 \\ 1 \end{bmatrix} = \frac{A_1}{D_1} \begin{bmatrix} X_1 \\ Y_1 \\ Z_1 \\ 1 \end{bmatrix}$$

wherein, $u_1$ is the abscissa of the pixel in the second image in the first image coordinate system, $v_1$ is the ordinate of the pixel in the second image in the first image coordinate system, $A_1$ is an intrinsic parameter of the first camera; $D_1$ is a scale factor of the first image, $X_1$ is the abscissa of the pixel in the second image in the first camera coordinate system, $Y_1$ is the ordinate of the pixel in the second image in the first camera coordinate system, $Z_1$ is the depth information of the pixel in the second image in the first camera coordinate system.

It should be noted that the first formula, the second formula, and the third formula described above correspond to the step S1431, the step S1433, and the step S1435 respectively. The coordinate information of the pixel in the second image is mapped to the first image coordinate system by using the coordinate transformation to obtain coordinate information of the pixel in the second image in the first image coordinate system.

It should also be noted that, as an equivalent expression, the procedure of mapping the coordinate information of the pixel in the second image to the first image coordinate system by using the coordinate transformation to obtain coordinate information of the pixel in the second image in the first image coordinate system can also performed as described in the following.

The coordinate information of the pixel in the second image in the second camera coordinate system is mapped to the first image coordinate system by using a fourth formula as follows to obtain coordinate information $m_1(u_1,v_1)$ of the pixel in the second image in the first image coordinate system:

$$m_1=(Z_2 A_1 R A_2^{-1} m_2 + A_1 t)/Z_1$$

$Z_2$ is the depth information of the pixel in the second image in the second camera coordinate system, $A_1$ is the intrinsic parameter of the first camera, R is the rotation matrix for the first camera coordinate system relative to the second camera coordinate system; $A_2^{-1}$ is the inverse matrix of $A_2$, $m_2$ is the coordinate information of the pixel in the second image in the second camera coordinate system, t is the translation vector for the first camera coordinate system relative to the second camera coordinate system; $Z_1$ is the depth information of the pixel in the second image in the first camera coordinate system. The depth information $Z_2$ of the pixel in the second image in the second camera coordinate system can be obtained based on the depth information of the RGB-D image, and the depth information $Z_1$ of the pixel in the second image in the first camera coordinate system can be calculated according to the first formula and the second formula described above. After $Z_1$ is obtained, the coordinate information $m_1(u_1,v_1)$ of the pixel in the second image in the first image coordinate system can thus be obtained by calculation using the fourth formula.

It should also be noted that the intrinsic parameter matrix $A_1$ of the first camera, the intrinsic parameter matrix $A_2$ of the second camera, the rotation matrix R for the first camera coordinate system relative to the second camera coordinate system, and the translation vector t for the first camera coordinate system relative to the second camera coordinate system can be obtained through calibration.

It should also be noted that the equation is established according to the relationship between a point on the image and the world coordinate system when imaging by a camera, and the intrinsic parameters $A_1$, $A_2$ and extrinsic parameters R, t of the camera are determined using proportional orthogonal projection. The procedure of calibrating the extrinsic parameters can be: if the target surfaces of the first camera and of the second camera are oriented in the same direction, and on a same plane of the world coordinate system with aligned baselines, then there is only a transition relationship between the camera coordinate systems of the two cameras, rather than a rotation relationship, and the extrinsic parameter calibration can be done by measuring the distance between the baselines of the two cameras. The procedure of calibrating the intrinsic parameter can be: the intrinsic parameter of a visible light camera is calibrated according to the Zhang Zhengyou calibration method by using a normal calibration plate with black-white blocks; the intrinsic parameter of an infrared camera is calibrated according to the Zhang Zhengyou calibration method by using a calibration plate with blocks specifically designed for infrared cameras, which can be similar to the calibration plate for the visible light camera, wherein the white blocks are coated with a material with a high reflectivity, and the black blocks are coated with a material with a low reflectivity.

Optionally, step S16, stitching the mapped pixels in the second image to the overlapping area and/or the extended area based on the depth information and visible light information of the pixels in the second image, can include:

Step S161, when the pixel in the second image is mapped to the overlapping area between the first image and the second image, performing a weighting operation on the visible light information of the pixel in the first image and the visible light information of the pixel in the second image, and assigning the weighted visible light information to the visible light information of the pixel in the overlapping area in the stitched image.

Specifically, in the above step S161, after the pixel in the second image is mapped to the first image, determining whether the visible light information and the depth information of the pixel are the same to determine whether the pixel is mapped to the overlapping area between first image and the second image. There will be at least two pieces of visible light information for a pixel in the overlapping area, the visible light information can be fused by weighting to obtain visible light information for the pixel in the stitched image.

Step S163, when the pixel in the second image is mapped to the extended area, assigning the visible light information of the pixel in the second image to the visible light information of the pixel in the extended area in the stitched image.

Specifically, in the step S163, when the pixel in the second image is mapped to the extended area, the visible light information of the pixel in the second image can be directly assigned to the visible light information of the pixel in the stitched image.

It should also be noted that the present application determines visible light information of a pixel in the stitched image based on the depth information and the visible light information of the pixel, which solves the problem that an occlusion occurs in the foreground and background during the image stitching, and improves stitching quality.

Optionally, step S16, stitching the mapped pixels in the second image to the overlapping area and/or the extended area based on the depth information and visible light information of the pixels in the second image to obtain a stitched image, can include:

Step S165, determining whether a plurality of pixels in the second image are mapped to a same pixel in the overlapping area and/or the extended area, based on the coordinate information of the mapped pixel in the second image in the first image coordinate system.

Step S167, when the plurality of pixels in the second image are mapped to the same pixel in the overlapping area and/or the extended area, determining the visible light information of the same pixel, in the overlapping area and/or the extended area in the stitched image based on a plurality of pieces of depth information of the plurality of pixels in the second image.

Specifically, when there are a plurality of pieces of depth information for the mapped pixel in the second image, it can be determined that the plurality of pixels in the second image are mapped to a same pixel in the extended area. When the plurality of pixels are mapped to the same pixel, a occlusion between foreground and background occurs.

Optionally, step S167, determining the visible light information of the same pixel, in the overlapping area and/or the extended area in the stitched image based on a plurality of pieces of depth information of the plurality of pixels in the second image, can include:

Step S1671, comparing the plurality of pieces of depth information of the plurality of pixels in the second image, and assigning visible light information of a pixel with the smallest depth information among the plurality of pieces of depth information to visible light information of the same pixel in the overlapping area and/or the extended area in the stitched image.

Specifically, in practice, only visible light information at points closer to a certain viewpoint can be seen from that viewpoint. Thus, the visible light information of a pixel with smaller depth information can be determined as the visible light information of the same pixel in the overlapping area and/or the extended area in the stitched image.

Step S1673, performing a weighting operation on the visible light information of the plurality of pixels in the second image, and assigning the weighted visible light information to visible light information of the same pixel in the overlapping area and/or the extended area in the stitched image.

Specifically, for a plurality of pixels, if the depth information of a pixel is smaller, the visible light information of the pixel is given a larger weight value. Weighting operation is performed on a plurality of pieces of visible light information of the plurality of pixels, and the weighted visible light information is determined as visible light information for a pixel in the overlapping area and/or extended area in the stitched image.

Figure 5:
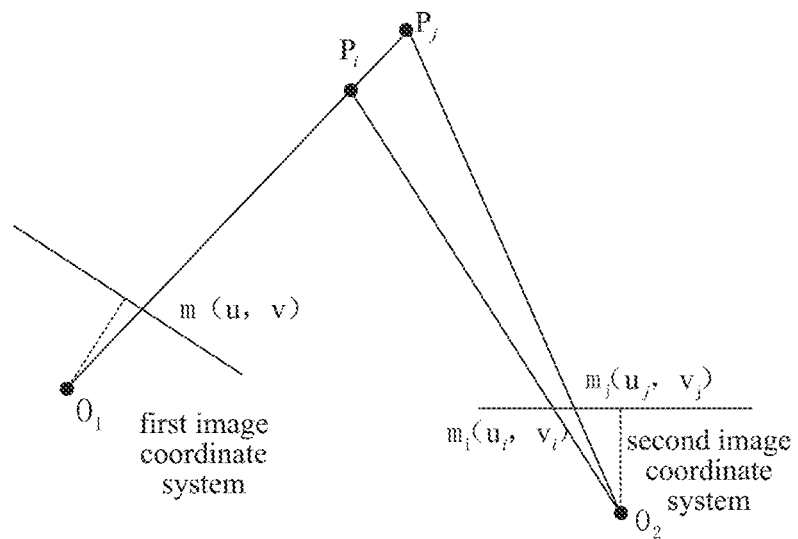
FIG. 5 is an optional schematic diagram of pixels when there is an occlusion according to the first embodiment of the present application.

In an optional application scenario, FIG. 5 is an optional schematic diagram of pixels when there is an occlusion according to the first embodiment of the present application. In FIG. 5, $P_i$ and $P_j$ are two points in space. The coordinate information for $P_i$ in the second image coordinate system is $m_i(u_i, v_i)$, and the coordinate information for $P_j$ in the second image coordinate system is $m_j(u_j, v_j)$. According to the coordinate transformation, $m_i(u_i, v_i)$ is mapped to m (u, v) in the first image coordinate system, and $m_j(u_j, v_j)$ is also mapped to m (u, v) in the first image coordinate system. Wherein, $u_i$ is the abscissa of $P_i$ in the second image coordinate system, $v_i$ is the ordinate of $P_i$ in the second image coordinate system, $u_j$ is the abscissa of $P_j$ in the second image coordinate system, $v_j$ is the ordinate of $P_j$ in the second image coordinate system, u is the abscissa of both $P_i$ and $P_j$ in the first image coordinate system, and v is the ordinate of both $P_i$ and $P_j$ in the first image coordinate system, In a practical situation, only visible light information at points closer to the viewpoint $O_1$ can be seen from $O_1$. Thus, the visible light information of a pixel with smaller depth information can be assigned to the point m (u, v). Alternatively, for a plurality of pixels, if the depth information of a pixel is smaller, the visible light information of the pixel is given a larger weight value. A weighting operation is performed on a plurality of pieces of visible light information of the plurality of pixels, and the weighted visible light information is determined as the visible light information for a pixel in the extended area in the stitched image.

Second Embodiment

According to the embodiments of the present application, a device embodiment for a device for image stitching is provided. It should be noted that this device for image stitching can be used to perform the method for image stitching in the embodiments of the present application. The method for image stitching in the embodiments of the present application can be performed by this device for image stitching. Those have been described in the method embodiments of the present application will not be described again.

Figure 6:
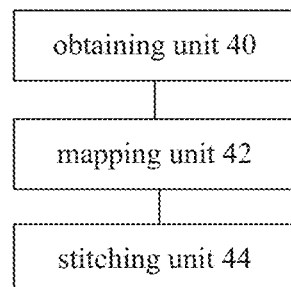
FIG. 6 is a schematic diagram of an optional device for image stitching according to a second embodiment of the present application.

FIG. 6 is a schematic diagram of an optional device for image stitching according to a second embodiment of the present application. As shown in FIG. 6, the device includes:

an obtaining unit 40, configured for obtaining a first image acquired by a first camera and a second image acquired by a second camera, wherein the first image is an image with visible light information, the second image is an image including depth information and visible light information, the first camera and the second camera are disposed adjacent to each other, and there is an overlapping area between the acquired first image and second image.

Specifically, in the obtaining unit 40, the first image can be a target image in the image stitching, the second image can be an image to be stitched in the image stitching, and there can be one or more images to be stitched. When there are more than one image to be stitched, the stitching procedure is the same as the procedure of stitching the second image to the first image. The first image can be a visible light image acquired by a visible light camera. When the first image is a visible light image acquired by the visible light camera, the first image can be used as a part of the target image to reduce the amount of computations and save camera costs. The second camera can be an RGB-D camera, and the second image acquired can be an RGB-D image that includes a visible light image and a depth image. That is, any pixel in the second image has both visible light information and depth information.

It should be noted that in the process of stitching the second image to the first image, there has to be an overlapping area between the second image and the first image. Because any pixel in the second image (i.e., an RGB-D image) contains both depth information and visible light information, for the pixels in the overlapping area, it is unnecessary to align the depth information and the visible light information in the mapping process, thereby achieving the purpose of improving the stitching efficiency.

A mapping unit 42, configured for mapping the pixels in the second image to the overlapping area and/or an extended area.

Specifically, the pixels in the second image (i.e., an image to be stitched) can be mapped to the first image (i.e., a target image) by coordinate transformation. Since the process of mapping any pixel in the second image to the first image is the same. That is to say, in the embodiment of the present application, the pixels in the overlapping area and in the extended area are mapped using the same method. Thus, the problems that there is ghosting in the transitional zone in the stitched image and that there may be an abrupt change in the transitional segment between the overlapping area and the extended area are solved, and the quality of fusion of the transitional segment between the overlapping area and the extended area is improved.

It should be noted that in the process of stitching the second image to the first image, there has to be an overlapping area between the second image and the first image. In the solution provided by the present application, because the process of mapping any pixel in the second image to the first image is the same, i.e., matching of feature points is not required in the present application, the area of the overlapping area can be reduced as much as possible, and thus the purpose of obtaining a stitched image with a larger field of view is achieved with the same number of stitching.

A stitching unit 44, configured for stitching the mapped pixels in the second image to the overlapping area and/or the extended area based on depth information and visible light information of the pixels in the second image to obtain a stitched image.

Specifically, when a pixel in the second image is mapped to the overlapping area, this pixel can have two pieces of visible light information and one piece of depth information. That is, for a pixel in the overlapping area, the amount of the visible light information is different from that of the depth information. When a pixel in the second image is mapped to the extended area, this pixel can have one piece of visible light information and one piece of depth information, or when there is an occlusion in a pixel in the extended area, this pixel can have a plurality of pieces of visible light information and depth information. That is, the pixel in the extended area has visible light information and depth information with a same amount.

It should be noted that when a pixel in the second image is mapped to the overlapping area, a weighting operation can be performed on the two pieces of visible light information, and the result of the weighting operation can be determined as the visible light information of the mapped pixel in the second image in the stitched image. When a pixel in the second image is mapped to the extended area, the visible light information of the pixel in the second image can be determined as the visible light information of the mapped pixel in the second image in the stitched image. When a plurality of pixels in the second image are mapped to the extended area and there is an occlusion, it is possible to compare a plurality of depth information of the plurality of pixels and determine the visible light information of the pixel with the smallest depth information as the visible light information of the plurality of mapped pixels in the stitched image.

It should also be noted that the present application determines the visible light information of the pixel in the stitched image based on the depth information and the visible light information of the pixel, which solves the problem that an occlusion occurs in the foreground and background during the image stitching, and improves stitching quality.

In the present application, with the obtaining unit 40 for obtaining a first image acquired by a first camera and a second image acquired by a second camera, wherein the first image is an image with visible light information, the second image is an image including depth information and visible light information, and the first camera and the second camera are disposed adjacent to each other, and there is an overlapping area between the acquired first image and second image; the mapping unit 42 for mapping the pixels in the second image to the overlapping area and/or the extended area; and the stitching unit 44 for stitching the mapped pixels in the second image to the overlapping area and/or the extended area based on depth information and visible light information of the pixels in the second image to obtain a stitched image, solving the technical problem of a low stitching efficiency in the image stitching process in the prior art.

Optionally, the mapping unit 42 can include:

a reading module, configured for reading coordinate information of a pixel in the second image in a second image coordinate system;

a coordinate transformation module, configured for mapping the coordinate information of the pixel in the second image in the second image coordinate system to a first image coordinate system by using coordinate transformation to obtain coordinate information of the pixel in the second image in the first image coordinate system;

a determining module, configured for determining a position of the pixel in the second image in the overlapping area and/or the extended area based on the coordinate information of the pixel in the second image in the first image coordinate system.

Optionally, the coordinate transformation module includes:

a first mapping sub-module, configured for mapping the coordinate information of the pixel in the second image in the second image coordinate system to a second camera coordinate system to obtain coordinate information of the pixel in the second image in the second camera coordinate system;

a second mapping sub-module, configured for mapping the coordinate information of the pixel in the second image in the second camera coordinate system to a first camera coordinate system to obtain coordinate information of the pixel in the second image in the first camera coordinate system;

a third mapping sub-module, configured for mapping the coordinate information of the pixel in the second image in the first camera coordinate system to the first image coordinate system to obtain coordinate information of the pixel in the second image in the first image coordinate system.

Optionally, the first mapping sub-module obtains coordinate information $m_2(X_2,Y_2,Z_2)$ of the pixel in the second image in the second camera coordinate system through calculation according to a first formula as follows:

$$\begin{bmatrix} X_2 \\ Y_2 \\ Z_2 \\ 1 \end{bmatrix} = D_2 * A_2^{-1} * \begin{bmatrix} u_2 \\ v_2 \\ 1 \end{bmatrix},$$

wherein $X_2$ is the abscissa of the pixel in the second image in the second camera coordinate system, $Y_2$ is the ordinate of the pixel in the second image in the second camera coordinate system, $Z_2$ is the depth information of the pixel in the second image in the second camera coordinate system; $A_2$ is an intrinsic parameter of the second camera; $A_2^{-1}$ is the inverse matrix of $A_2$; $D_2$ is a scale factor of the second image, $u_2$ is the abscissa of the pixel in the second image in the second image coordinate system, $v_2$ is the ordinate of the pixel in the second image in the second image coordinate system.

Optionally, the second mapping sub-module obtains coordinate information $m_1(X_1,Y_1,Z_1)$ of the pixel in the second image in the first camera coordinate system through calculation according to a second formula as follows:

$$\begin{bmatrix} X_1 \\ Y_1 \\ Z_1 \\ 1 \end{bmatrix} = \begin{bmatrix} R, t \\ 0^T, 1 \end{bmatrix} \begin{bmatrix} X_2 \\ Y_2 \\ Z_2 \\ 1 \end{bmatrix},$$

wherein, $X_1$ is the abscissa of the pixel in the second image in the first camera coordinate system, $Y_1$ is the ordinate of the pixel in the second image in the first camera coordinate system, $Z_1$ is the depth information of the pixel in the second image in the first camera coordinate system; R is a rotation matrix for the first camera coordinate system relative to the second camera coordinate system; t is a translation vector for the first camera coordinate system relative to the second camera coordinate system; $O^T$ is a zero matrix, $X_2$ is the abscissa of the pixel in the second image in the second camera coordinate system, $Y_2$ is the ordinate of the pixel in the second image in the second camera coordinate system, $Z_2$ is the depth information of the pixel in the second image in the second camera coordinate system.

It should be noted that the first formula, the second formula, and the third formula described above correspond to the first mapping sub-module, the second mapping sub-module, and the third mapping sub-module, respectively. The coordinate information of the pixel in the second image is mapped to the first image coordinate system by using the coordinate transformation to obtain coordinate information of the pixel in the second image in the first image coordinate system.

It should also be noted that, as an equivalent expression, the procedure, implemented by the coordinate transformation module, of mapping the coordinate information of the pixel in the second image to the first image coordinate system by using the coordinate transformation to obtain coordinate information of the pixel in the second image in the first image coordinate system can also performed as described in the following.

The coordinate information of the pixel in the second image in the second camera coordinate system is mapped to the first image coordinate system by using a fourth formula as follows to obtain coordinate information $m_1(u_1,v_1)$ of the pixel in the second image in the first image coordinate system:

$$m_1 = (Z_2 A_1 R A_2^{-1} m_2 + A_1 t)/Z_1$$

wherein $Z_1$ is the depth information of the pixel in the second image in the second camera coordinate system, $A_1$ is the intrinsic parameter of the first camera, R is the rotation matrix for the first camera coordinate system relative to the second camera coordinate system; $A_2^{-1}$ is the inverse matrix of $A_2$, $m_2$ is the coordinate information of the pixel in the second image in the second camera coordinate system, t is a translation vector for the first camera coordinate system relative to the second camera coordinate system; $Z_1$ is the depth information of the pixel in the second image in the first camera coordinate system. The depth information $Z_2$ of the pixel in the second image in the second camera coordinate system can be obtained based on the depth information of the RGB-D image, and the depth information $Z_1$ of the pixel in the second image in the first camera coordinate system can be calculated by using the first formula and the second formula described above. After $Z_1$ is obtained, the coordinate information $m_1(u_1,v_1)$ of the pixel in the second image in the first image coordinate system can thus be obtained by calculation using the fourth formula.

It should also be noted that the intrinsic parameter matrix $A_1$ of the first camera, the intrinsic parameter matrix $A_2$ of the second camera, the rotation matrix R for the first camera coordinate system relative to the second camera coordinate system, and the translation vector t for the first camera coordinate system relative to the second camera coordinate system can be obtained by through calibration.

It should also be noted that the equation is established according to the relationship between a point on the image and the world coordinate system when imaging by a camera, and the extrinsic parameters R, t of the camera are determined using proportional orthogonal projection.

Optionally, the third mapping sub-module obtains coordinate information $m_1(u_1,v_1)$ for the pixel in the second image in the first image coordinate system through calculation according to a third formula as follows:

$$\begin{bmatrix} u_1 \\ v_1 \\ 1 \end{bmatrix} = \frac{A_1}{D_1} \begin{bmatrix} X_1 \\ Y_1 \\ Z_1 \\ 1 \end{bmatrix}$$

wherein, $u_1$ is the abscissa of the pixel in the second image in the first image coordinate system, $v_1$ is the ordinate of the pixel in the second image in the first image coordinate system, $A_1$ is an intrinsic parameter of the first camera; DL is a scale factor of the first image, $X_1$ is the abscissa of the pixel in the second image in the first camera coordinate system, $Y_1$ is the ordinate of the pixel in the second image in the first camera coordinate system, $Z_1$ is the depth information of the pixel in the second image in the first camera coordinate system.

Optionally, the stitching unit 44 includes:

a first stitching module configured for, when the pixel in the second image is mapped to the overlapping area between the first image and the second image, performing a weighting operation on the visible light information of the pixel in the first image and the visible light information of the pixel in the second image, and assigning the weighted visible light information to the visible light information of the pixel in the overlapping area in the stitched image.

Specifically, after the pixel in the second image is mapped to the first image, determining whether the visible light information and the depth information of the pixel are the same to determine whether the pixel is mapped to the overlapping area between the first image and the second image. There will be at least two pieces of visible light information for a pixel in the overlapping area, the visible light information can be fused by weighting to obtain the visible light information for the pixel in the stitched image.

A second stitching module configured for, when a pixel in the second image is mapped to the extended area, assigning the visible light information of the pixel in the second image to the visible light information of the pixel in the extended area in the stitched image.

Specifically, when the pixel in the second image is mapped to the extended area, the visible light information of the pixel in the second image can be directly assigned to the visible light information of the pixel in the stitched image.

It should also be noted that the present application determines visible light information of a pixel in the stitched image based on the depth information and the visible light information of a pixel, which solves the problem that an occlusion occurs in the foreground and background during the image stitching, and improves stitching quality.

Optionally, the stitching unit can further include:

a judging module, configured for determining whether a plurality of pixels in the second image are mapped to a same pixel in the overlapping area and/or the extended area, based on the coordinate information of the mapped pixel in the second image in the first image coordinate system.

A determining module configured for, when the plurality of pixels in the second image are mapped to the same pixel in the overlapping area and/or the extended area, determining visible light information of the same pixel, in the overlapping area and/or the extended area in the stitched image based on a plurality of pieces of depth information of the plurality of pixels in the second image.

Specifically, when there are a plurality of pieces of depth information for the mapped pixel in the second image, it can be determined that the plurality of pixels in the second image are mapped to a same pixel in the extended area. When the plurality of pixels are mapped to the same pixel, a occlusion between foreground and background occurs.

Optionally, the determining module can include:

a comparing sub-module, configured for comparing the plurality of pieces of depth information of the plurality of pixels in the second image, and assigning the visible light information of a pixel with the smallest depth information among the plurality of pieces of depth information to visible light information of the same pixel in the overlapping area and/or the extended area in the stitched image.

Specifically, in practice, only visible light information at points closer to a certain viewpoint can be seen from that viewpoint. Thus, visible light information of a pixel with smaller depth information can be determined as the visible light information of the same pixel in the stitched image.

A weighting sub-module, configured for performing a weighting operation on the visible light information of the plurality of pixels in the second image, and assigning the weighted visible light information to visible light information of the same pixel in the overlapping area and/or the extended area in the stitched image.

Specifically, for a plurality of pixels, if the depth information of a pixel is smaller, the visible light information of the pixel is given a larger weight value. Weighting operation is performed on a plurality of pieces of visible light information of the plurality of pixels, and the weighted visible light information is determined as visible light information for a pixel in the overlapping area and/or extended area in the stitched image.

Figure 7:
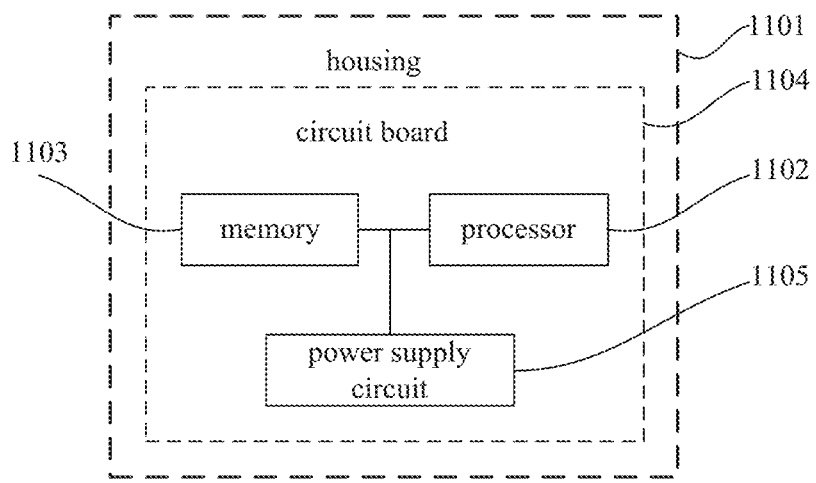
FIG. 7 is a schematic structural diagram of an electronic apparatus according to an optional embodiment of the present application.

As shown in FIG. 7, an embodiment of the present application provides an electronic apparatus, including: a housing 701, a processor 702, a memory 703, a circuit board 704, and a power supply circuit 705, wherein the circuit board 704 is arranged inside a space enclosed by the housing 701, the processor 702 and the memory 703 are arranged on the circuit board 704; the power supply circuit 705 is used to supply power for various circuits or elements of the electronic apparatus; the memory 703 is configured to storing executable program codes; the processor 702 performs the method for image stitching provided by embodiments of the present application by executing the executable program codes stored on the memory, wherein the method for image stitching including:

obtaining a first image acquired by a first camera and a second image acquired by a second camera, wherein the first image is an image with visible light information, the second image is an image including depth information and visible light information, and the first camera and the second camera are disposed adjacent to each other, and there is an overlapping area between the acquired first image and second image;

mapping pixels in the second image to the overlapping area and/or an extended area, wherein the extended area is an image area formed by pixels in the second image which are mapped to the outside of the first image;

stitching the mapped pixels in the second image to the overlapping area and/or the extended area based on depth information and visible light information of the pixels in the second image to obtain a stitched image.

In the present embodiment, the processor in the electronic apparatus executes the executable program codes stored on the memory to perform the above image stitching method according to the present application, which improves the efficiency of image stitching and thereby solves the technical problem of a low stitching efficiency in image stitching process in the prior art.

An embodiment of the present application further provides an application for performing a method for image stitching when being executed. The method for image stitching can include:

obtaining a first image acquired by a first camera and a second image acquired by a second camera, wherein the first image is an image with visible light information, the second image is an image including depth information and visible light information, and the first camera and the second camera are disposed adjacent to each other, and there is an overlapping area between the acquired first image and second image;

mapping pixels in the second image to the overlapping area and/or an extended area, wherein the extended area is an image area formed by pixels in the second image which are mapped to the outside of the first image;

stitching the mapped pixels in the second image to the overlapping area and/or the extended area based on depth information and visible light information of the pixels in the second image to obtain a stitched image.

In the present embodiment, the application is configured to perform the above image stitching method according to the present application when being executed, which improves the efficiency of image stitching and thereby solves the technical problem of a low stitching efficiency in image stitching process in the prior art.

An embodiment of the present application further provides a storage medium for storing executable program codes, and the executable program codes are executed to perform the method for image stitching. The method for image stitching can include:

obtaining a first image acquired by a first camera and a second image acquired by a second camera, wherein the first image is an image with visible light information, the second image is an image including depth information and visible light information, and the first camera and the second camera are disposed adjacent to each other, and there is an overlapping area between the acquired first image and second image;

mapping pixels in the second image to the overlapping area and/or an extended area, wherein the extended area is an image area formed by pixels in the second image which are mapped to the outside of the first image;

stitching the mapped pixels in the second image to the overlapping area and/or the extended area based on depth information and visible light information of the pixels in the second image to obtain a stitched image.

In the present embodiment, the storage medium stores executable program codes that are executed to perform the method for image stitching of the present application described above, thereby improving the efficiency of image stitching and thereby solving the technical problem of a low stitching efficiency in image stitching process in the prior art.

For embodiments for an electronic apparatus, an application and a storage medium, since the methods involved are similar to the embodiments of the method described above, the description thereof is relatively simple; the relating parts can refer to the parts of the description of embodiments of the method.

The serial numbers of the embodiments of the present application are only for description and do not indicate that one embodiment is better than the other.

In the foregoing embodiments of the present application, the description of each embodiment has its own emphasis.

For the part that is not described in detail in an embodiment, reference may be made to the relevant description of other embodiments.

It should be understood that in the embodiments herein, the disclosed technical solution can be implemented in other ways. The device embodiments described above are merely illustrative. For example, the device can be divided into units according to the logical functions, however, in practice, the device can be divided in other ways. For example, a plurality of units or components can be combined or integrated into another system, or some features can be ignored or not executed. Further, the coupling, direct coupling or communication connections between the interfaces, units or modules shown or described above can be indirect coupling or communication connections, or electrical connections or other forms of connections.

The units illustrated as separate components may or may not be physically separated. The components shown as units may or may not be physical units, and can be located on one unit or can be distributed on a plurality of units. Some or all of the units can be selected from the units above according to actual needs to achieve the objective of the solution of the embodiments.

In addition, all the functional units in the embodiments of the present application can be integrated in one processing unit, or each of the units can be an individual unit, or two or more units can be integrated in one unit. The integrated unit described above can be implemented as hardware or can be implemented as a software function unit.

When implemented as a software function unit and sold or used as an independent product, the integrated unit can be stored in a computer readable storage medium. On the basis of the understanding above, the essential technical solution of the present application, or the part contributing to the prior art, or all or a part of the technical solution can be implemented as a software product. The computer software product is stored on a storage medium including instructions to cause a computing device (such as a personal computer, a server or a network equipment) perform all or some of the steps of the method according to each embodiment of the present application. The storage medium includes medium capable of storing program codes, such as a USB flash disk, a Read Only Memory (ROM), a Random Access Memory (RAM), a mobile hard disk, a magnetic disk, or an optical disk.

The implementations are merely preferred implementations of the present application. It should be noted that those of ordinary skills in the art can make improvements and modifications without departing from the principle of the present application, and these improvements and modifications should be considered within the protection scope of the present application.

The invention claimed is:

1. A method for image stitching, comprising
obtaining a first image acquired by a first camera and a second image acquired by a second camera, wherein the first image is an image with visible light information, the second image is an image comprising depth information and visible light information, the first camera and the second camera are disposed adjacent to each other, and there is an overlapping area between the acquired first image and second image;
mapping pixels in the second image to the overlapping area and/or an extended area, wherein the extended area is an image area formed by pixels in the second image which are mapped to the outside of the first image;
stitching the mapped pixels in the second image to the overlapping area and/or the extended area based on depth information and visible light information of the pixels in the second image to obtain a stitched image.

2. The method according to claim 1, wherein the step of mapping pixels in the second image to the overlapping area and/or an extended area, comprises:
reading coordinate information of a pixel in the second image in a second image coordinate system;
mapping the coordinate information of the pixel in the second image in the second image coordinate system to a first image coordinate system by using coordinate transformation to obtain coordinate information of the pixel in the second image in the first image coordinate system;
determining a position of the pixel in the second image in the overlapping area and/or the extended area based on the coordinate information of the pixel in the second image in the first image coordinate system.

3. The method according to claim 2, wherein the step of mapping the coordinate information of the pixel in the second image in the second image coordinate system to a first image coordinate system by using coordinate transformation to obtain coordinate information of the pixel in the second image in the first image coordinate system, comprises:
mapping the coordinate information of the pixel in the second image in the second image coordinate system to a second camera coordinate system to obtain coordinate information of the pixel in the second image in the second camera coordinate system;
mapping the coordinate information of the pixel in the second image in the second camera coordinate system to a first camera coordinate system to obtain coordinate information of the pixel in the second image in the first camera coordinate system;
mapping the coordinate information of the pixel in the second image in the first camera coordinate system to the first image coordinate system to obtain coordinate information of the pixel in the second image in the first image coordinate system.

4. The method according to claim 3, wherein the coordinate information $m_2(u_2,v_2)$ of the pixel in the second image in the second image coordinate system is mapped to the second camera coordinate system by using a first formula as follows to obtain coordinate information $m_2(X_2,Y_2,Z_2)$ of the pixel in the second image in the second camera coordinate system;

$$\begin{bmatrix} X_2 \\ Y_2 \\ Z_2 \\ 1 \end{bmatrix} = D_2 * A_2^{-1} * \begin{bmatrix} u_2 \\ v_2 \\ 1 \end{bmatrix},$$

wherein $A_2$ is an intrinsic parameter of the second camera; and $D_2$ is a scale factor of the second image.

5. The method according to claim 4, wherein the coordinate information $m_2(X_2,Y_2,Z_2)$ of the pixel in the second image in the second camera coordinate system is mapped to the first camera coordinate system by using a second formula as follows to obtain coordinate information $m_1(X_1,Y_1,Z_1)$ of the pixel in the second image in the first camera coordinate system;

$$\begin{bmatrix} X_1 \\ Y_1 \\ Z_1 \\ 1 \end{bmatrix} = \begin{bmatrix} R, t \\ 0^T, 1 \end{bmatrix} \begin{bmatrix} X_2 \\ Y_2 \\ Z_2 \\ 1 \end{bmatrix},$$

wherein R is a rotation matrix for the first camera coordinate system relative to the second camera coordinate system, t is a translation vector for the first camera coordinate system relative to the second camera coordinate system.

6. The method according to claim 5, wherein the coordinate information $m_1(X_1,Y_1,Z_1)$ of the pixel in the second image in the first camera coordinate system is mapped to the first image coordinate system by using a third formula as follows to obtain coordinate information $m_1(u_1,v_1)$ of the pixel in the second image in the first image coordinate system;

$$\begin{bmatrix} u_1 \\ v_1 \\ 1 \end{bmatrix} = \frac{A_1}{D_1} \begin{bmatrix} X_1 \\ Y_1 \\ Z_1 \\ 1 \end{bmatrix}$$

wherein $A_1$ is an intrinsic parameter of the first camera; and $D_1$ is a scale factor of the first mage.

7. The method according to claim 1, wherein the step of stitching the mapped pixels in the second image to the overlapping area and/or the extended area based on depth information and visible light information of the pixels in the second image to obtain a stitched image, comprises:
when a pixel in the second image is mapped to the overlapping area, performing a weighting operation on the visible light information of the pixel in the first image and the visible light information of the pixel in the second image, and assigning the weighted visible light information to the visible light information of the pixel in the overlapping area in the stitched image;
when a pixel in the second image is mapped to the extended area, assigning the visible light information of the pixel in the second image to the visible light information of the pixel in the extended area in the stitched image.

8. The method according to claim 2, wherein the step of stitching the mapped pixels in the second image to the overlapping area and/or the extended area based on depth information and visible light information of the pixels in the second image to obtain a stitched image, comprises:
determining whether a plurality of pixels in the second image are mapped to a same pixel in the overlapping area and/or the extended area, based on the coordinate information of the mapped pixel in the second image in the first image coordinate system;
when the plurality of pixels in the second image are mapped to the same pixel in the overlapping area and/or the extended area, determining visible light information of the same pixel, in the overlapping area and/or the extended area in the stitched image based on a plurality of pieces of depth information of the plurality of pixels in the second image.

9. The method according to claim 8, wherein the step of determining the visible light information of the same pixel, in the overlapping area and/or the extended area in the stitched image based on a plurality of pieces of depth information of the plurality of pixels in the second image, comprises:
comparing the plurality of pieces of depth information of the plurality of pixels in the second image, and assigning visible light information of a pixel with the smallest depth information among the plurality of pieces of depth information to visible light information of the same pixel in the overlapping area and/or the extended area in the stitched image; or
performing a weighting operation on visible light information of the plurality of pixels in the second image, and assigning the weighted visible light information to visible light information of the same pixel in the overlapping area and/or the extended area in the stitched image.

10. A non-transitory computer readable storage medium for storing executable program codes, the executable program codes are executed to perform the method for image stitching of claim 1.

11. An electronic device, which comprises: one or more processors, one or more memories, wherein the one or more memories are configured to store executable program codes; the executable program codes stored in the one or more memories are executed by the one or more processors to perform:
obtaining a first image acquired by a first camera and a second image acquired by a second camera, wherein the first image is an image with visible light information, the second image is an image comprising, depth information and visible light information, the first camera and the second camera are disposed adjacent to each other, and there is an overlapping area between the acquired first image and second image;
mapping pixels in the second image to the overlapping area and/or an extended area, wherein the extended area is an image area formed by pixels in the second image which are mapped to the outside of the first image;
stitching the mapped pixels in the second image to the overlapping area and/or the extended area based on depth information and visible light information of the pixels in the second image to obtain a stitched image.

12. The device according to claim 11, wherein the executable program codes stored in the one or more memories are executed by the one or more processors to perform:
reading coordinate information of a pixel in the second image in a second image coordinate system;
mapping the coordinate information of the pixel in the second image in the second image coordinate system to a first image coordinate system by using coordinate transformation to obtain coordinate information of the pixel in the second image in the first image coordinate system;
determining a position of the pixel in the second image in the overlapping area and/or the extended area based on the coordinate information of the pixel in the second image in the first image coordinate system.

13. The device according to claim 12 wherein the executable program codes stored in the one or more memories are executed by the one or more processors to perform:
mapping the coordinate information of the pixel in the second image in the second image coordinate system to a second camera coordinate system to obtain coordinate information of the pixel in the second image in the second camera coordinate system;
mapping the coordinate information of the pixel in the second image in the second camera coordinate system to a first camera coordinate system to obtain coordinate information of the pixel in the second image in the first camera coordinate system;

mapping the coordinate information of the pixel in the second image in the first camera coordinate system to the first image coordinate system to obtain coordinate information of the pixel in the second image in the first image coordinate system.

14. The device according to claim 13, wherein the executable program codes stored in the one or more memories are executed by the one or more processors to perform: obtaining coordinate information $m_2(X_2,Y_2,Z_2)$ of the pixel in the second image in the second camera coordinate system through calculation according to a first formula as follows:

$$\begin{bmatrix} X_2 \\ Y_2 \\ Z_2 \\ 1 \end{bmatrix} = D_2 * A_2^{-1} * \begin{bmatrix} u_2 \\ v_2 \\ 1 \end{bmatrix},$$

wherein $A_2$ is an intrinsic parameter of the second camera; and $D_2$ is a scale factor of the second image.

15. The device according to claim 14, wherein the executable program codes stored in the one or more memories are executed by the one or more processors to perform: obtaining coordinate information $m_1(X_1,Y_1,Z_3)$ of the pixel in the second image in the first camera coordinate system through calculation according to a second formula as follows:

$$\begin{bmatrix} X_1 \\ Y_1 \\ Z_1 \\ 1 \end{bmatrix} = \begin{bmatrix} R, t \\ 0^T, 1 \end{bmatrix} \begin{bmatrix} X_2 \\ Y_2 \\ Z_2 \\ 1 \end{bmatrix},$$

wherein R is a rotation matrix for the first camera coordinate system relative to the second camera coordinate system, t is a translation vector for the first camera coordinate system relative to the second camera coordinate system.

16. The device according to claim 15, wherein the executable program codes stored in the one or more memories are executed by the one or more processors to perform: obtaining coordinate information $m_1(u_1,v_1)$ of the pixel in the second image in the first image coordinate system through calculation according to a third formula as follows:

$$\begin{bmatrix} u_1 \\ v_1 \\ 1 \end{bmatrix} = \frac{A_1}{D_1} \begin{bmatrix} X_1 \\ Y_1 \\ Z_1 \\ 1 \end{bmatrix}$$

wherein $A_1$ is an intrinsic parameter of the first camera; and $D_1$ is a scale factor of the first image.

17. The device according to claim 12, wherein the executable program codes stored in the one or more memories are executed by the one or more processors to perform:

determining whether a plurality of pixels in the second image are mapped to a same pixel in the overlapping area and/or the extended area, based on the coordinate information of the mapped pixel in the second image in the first image coordinate system;

when the plurality of pixels in the second image are mapped to the same pixel in the overlapping area and/or the extended area, determining visible light information of the same pixel, in the overlapping area and/or the extended area in the stitched image based on a plurality of pieces of depth information of the plurality of pixels in the second image.

18. The device according to claim 17, wherein the executable program codes stored in the one or more memories are executed by the one or more processors to perform:

comparing the plurality of pieces of depth information of the plurality of pixels in the second image, and assigning visible light information of a pixel with the smallest depth information among the plurality of pieces of depth information to visible light information of the same pixel in the overlapping area and/or the extended area in the stitched image;

performing a weighting operation on visible light information of the plurality of pixels in the second image, and assigning the weighted visible light information to visible light information of the same pixel in the overlapping area and/or the extended area in the stitched image.

19. The device according to claim 11, wherein the executable program codes stored in the one or more memories are executed by the one or more processors to perform:

when a pixel in the second image is mapped to the overlapping area, performing a weighting operation on the visible light information of the pixel in the first image and the visible light information of the pixel in the second image, and assigning the weighted visible light information to the visible light information of the pixel in the overlapping area in the stitched image;

when a pixel in the second image is mapped to the extended area, assigning the visible light information of the pixel in the second image to the visible light information of the pixel in the extended area in the stitched image.

\* \* \* \* \*